US011467242B2

(12) United States Patent
Shiba (10) Patent No.: US 11,467,242 B2
(45) Date of Patent: Oct. 11, 2022

(54) DIRECTION-OF-ARRIVAL ESTIMATION APPARATUS, METHOD, AND NON-TRANSITORY MEDIUM

(71) Applicant: NEC CORPORATION, Tokyo (JP)

(72) Inventor: Hisashi Shiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 178 days.

(21) Appl. No.: 16/884,157

(22) Filed: May 27, 2020

(65) Prior Publication Data

US 2020/0379078 A1 Dec. 3, 2020

(30) Foreign Application Priority Data

May 29, 2019 (JP) .............................. JP2019-099889

(51) Int. Cl.
*G01S 3/50* (2006.01)
*G01S 3/04* (2006.01)
*G01S 13/06* (2006.01)
*H01Q 21/06* (2006.01)

(52) U.S. Cl.
CPC .............. *G01S 3/50* (2013.01); *G01S 3/043* (2013.01); *G01S 13/06* (2013.01); *H01Q 21/06* (2013.01)

(58) Field of Classification Search
CPC ............ G01S 3/50; G01S 3/043; G01S 13/06; H01Q 2121/06
USPC ................ 342/157, 417, 450, 174, 375, 169
See application file for complete search history.

(56) References Cited

U.S. PATENT DOCUMENTS

| 7,474,258 B1 | 1/2009 | Arikan et al. |
| 10,620,305 B2 | 4/2020 | Cornic et al. |
| 2009/0027257 A1 | 1/2009 | Arikan et al. |
| 2018/0120427 A1 | 5/2018 | Cornic et al. |
| 2018/0128892 A1* | 5/2018 | Granato ................ G01S 3/74 |
| 2019/0025419 A1 | 1/2019 | Shiba |

FOREIGN PATENT DOCUMENTS

| EP | 3 319 172 A1 | 5/2018 |
| JP | 59-072073 A | 4/1984 |
| JP | 59-160783 A | 9/1984 |
| JP | 60-141577 U | 9/1985 |
| JP | 61-138187 A | 6/1986 |
| JP | 05-150037 A | 6/1993 |
| JP | 2727949 B2 | 3/1998 |

(Continued)

*Primary Examiner* — Bo Fan
(74) *Attorney, Agent, or Firm* — Sughrue Mion, PLLC (57) ABSTRACT

A direction of arrival estimation apparatus includes at least first and second sub-arrays to receive a reflected wave of a transmission waveform from a target; first and second phasing parts that perform phasing of reception signals at the first and second sub-arrays to generate first and second sub-array beams; an arrival time difference calculation part that calculates first and second correlations of the reception signals of the first and second sub-array beams at first and second time points to find an arrival time difference between times of the reflected wave arriving at the first and second sub-arrays, based on a result of a predetermined operation on the first and second correlations and a time difference between the first time point and the second time point; and a direction of arrival calculation part that finds a direction of arrival of the target based on the arrival time difference.

18 Claims, 7 Drawing Sheets

(56) References Cited

FOREIGN PATENT DOCUMENTS

| | | |
|---|---|---|
| JP | 2900631 B2 | 6/1999 |
| JP | 2016-148638 A | 8/2016 |
| JP | 2019-023577 A | 2/2019 |
| WO | 2018/089082 A1 | 5/2018 |

* cited by examiner

$\theta$ : DIRECTION OF ARRIVAL $$\theta = \sin^{-1} \frac{\varphi \cdot c}{2\pi fc\,d}$$

$c$ : SOUND VELOCITY $fc$ : FREQUENCY $d$ : DISTANCE BETWEEN RIGHT AND LEFT BEAMS

DIRECTION-OF-ARRIVAL ESTIMATION APPARATUS, METHOD, AND NON-TRANSITORY MEDIUM

CROSS REFERENCE TO RELATED APPLICATIONS

This application is based upon and claims the benefit of the priority of Japanese patent application No. 2019-099889, filed on May 29, 2019, the disclosure of which is incorporated herein in its entirety by reference thereto.

FIELD

The present invention relates to a direction of arrival estimation apparatus, a method, and a non-transitory medium.

BACKGROUND

Adaptive beamforming is used in sonar, radar, and so on, as a technique for achieving high-accuracy estimation of direction of arrival of a target. Further, recently, research of a technique using a compressed (compressive) sensing technology has been progressing. This technique estimates a direction of arrival (DOA) by scanning a beam over directions of interest and obtaining a peak of an output. This technique needs, due to a temporal shift or the like, a processing load, even for processing of just a single direction, higher than that for beamforming in which only alignment of phases of reception signals is performed. In order to enhance calculation accuracy of target direction, it is necessary to perform fine scanning over directions. As a result, the number of times of calculation in the beamforming increases, which incurs an increase in a processing load. The processing load is particularly high in adaptive beamforming or compressed sensing using a MUSIC (Multiple Signal Classification) method which provides high direction resolution.

There is a method, where a reception array (line array) that includes a plurality of receivers (echo receivers) divided into a plurality of sub-arrays (sub-arrays) and beamforming, whose processing load is comparatively low is performed in each sub-array, to estimate a direction of arrival (such as azimuth) of a target by using a phase difference between sub-array beams (beams generated by the beamforming in each sub-array). Since processing of this method is simple and has a low processing load, this method is often used in sonars, radars, and so on.

Figure 5:
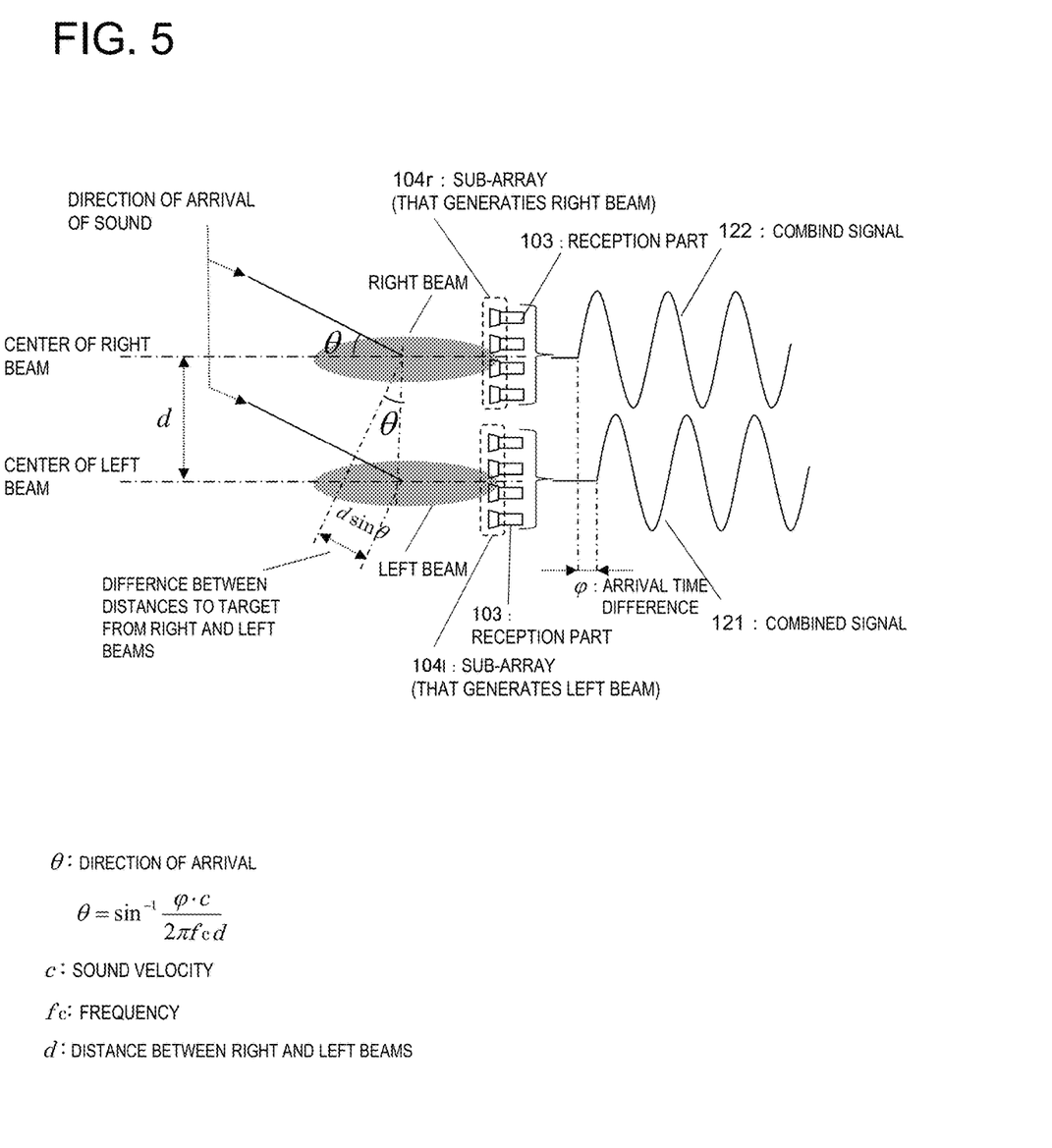
FIG. 5 is a diagram illustrating a related art.

FIG. 5 is a diagram schematically illustrating, as a typical example of a related technology, estimation of direction of arrival using a phase difference between a right beam and a left beam in two sub-arrays obtained by division of a reception array into right and left sides. A sub-array 104, on a right side generates a right beam (sub-array beam) while a sub-array 104$_l$ on a left side generates a left beam (sub-array beam). Centers of the right and left beams are spaced apart by a distance d. Assuming that the direction of arrival is denoted as θ (an angle of an echo arrival direction with respect to a normal direction of each of the sub-arrays 104$_r$ and 104$_l$), d sin θ is a difference in distances to a target between the right beams and the left beams.

A phase difference φ between a signal 121 obtained by combining signals received at a plurality of reception parts (receivers) 103 in the sub-array 104$_l$ and a signal 122 obtained by combining signals received at a plurality of reception parts 103 in the sub-array 104$_r$ corresponds to a difference in distances to a target. Since one wavelength λ corresponds to a phase of 2π radians, the following equation holds:

$$\varphi = 2\pi \frac{d \sin \theta}{\lambda} = 2\pi \frac{f_c d \sin \theta}{c} \quad (1)$$

where c is a velocity of a wave (sound wave or radio wave) and fc is a frequency.

Accordingly, as illustrated in FIG. 5, the following equation holds:

$$\theta = \sin^{-1} \frac{\varphi c}{2\pi f_c d} \quad (2)$$

As a related technology, Patent Literature 1, for example, discloses a moving target detection system comprising transmission waveform setting means for setting a transmission signal in such a way that a frequency of the transmission signal is linearly changed; transmitting means for transmitting the transmission signal; receiving means for receiving a reception signal resulting from a reflection of the transmission signal at an target; Doppler coefficient estimating means for estimating a Doppler coefficient associated with a movement of the target by performing arithmetic operation processing on a waveform of the reception signal at a current time and waveforms of the reception signal at one or more past specified time; and target detection means for detecting the target based on the transmission signal, the Doppler coefficient, and the reception signal.

Patent Literature 2 discloses a sonar apparatus comprising an antenna part constituted from a plurality of element antennas; a radar control part configured to determine a frequency band and a beam scanning frequency to be assigned for each of a plurality of sub-arrays obtained by division of the plurality of element antennas; a phase shifter control part configured to calculate a phase adjustment amount for each element antenna based on the beam scanning frequency; a phase shifter disposed for each element antenna and configured to adjust the phase of a reception signal received at the antenna part, based on the phase adjustment amount; a synthesis distribution part configured to synthesize, for each sub-array, the reception signal whose phase has been adjusted by the phase shifter, a reception processing part configured to process a reception signal obtained by the synthesis by the synthesis distribution part, and an target detection part configured to detect a target signal from the reception signal obtained by the processing by the reception processing part.

Patent Literature 3 discloses a radar signal processing apparatus mainly comprising: a phase calculation part configured to obtain a phase of each reception signal at arbitrary two of antenna elements of an array antenna whose azimuth angles are the same and whose elevation angles are different; a phase difference calculation part to calculate a phase difference between the reception signals of the two antenna elements, a vertical direction speed calculation part configured to calculate a speed of an target moving in a vertical direction based on a change amount of the phase difference per unit time.

As regard to compressive sensing, reference may be made to Patent Literature 4, etc., for example. According to Patent Literature 4, a determination of an angle of arrival (AOA) of radiofrequency (RF) radiation can be made using compressive sensing techniques to inform a receiver portion of a radar system using fewer measurements and samples of the received signal. A method for compressive sensing at an array antenna includes forming a plurality of subarrays of array elements from the array antenna such that each subarray includes two or more array elements, capturing data at the plurality of subarrays of array elements, modulating phase properties of the data captured at each of the subarrays, combining the modulated data from each of the plurality of subarrays to form a measurement having phase and magnitude measurements corresponding to the combined modulated data and determining angle of arrival information for the data using a measurement matrix.

As regard to sub-arrays of an antenna for radar, Patent Literature 5 or the like, for example, is referred to. In Patent Literature 5, a radar comprises at least one array antenna composed of transmit sub-arrays and of receive sub-arrays, a transmit and receive system and processing means. The distribution of the transmit sub-arrays and receive sub-arrays is symmetric both with respect to a vertical axis and a horizontal axis. At least two transmit sub-arrays symmetric with respect to the vertical axis are the largest possible distance apart. At least two transmit sub-arrays symmetric with respect to the horizontal axis are the largest possible distance apart. At least two receive sub-arrays symmetric with respect to the vertical axis are the largest possible distance apart. At least two receive sub-arrays symmetric with respect to the horizontal axis are the largest possible distance apart. A first coding of the wave transmitted by the transmit sub-arrays is carried out by frequency shifting of the ramps between the various transmit sub-arrays. A second coding of the wave transmitted by the transmit sub-arrays is carried out by phase modulation from frequency ramp to frequency ramp between the various transmit sub-arrays.

[PTL 1]
JP Patent Kokai Publication No. JP2019-23577A
[PTL2]
JP Patent Kokai Publication No. JP2016-148638A
[PTL3]
JP Patent Kokai Publication No. JP-H05-150037A
[PTL4]
International Publication No. WO2018/089082
[PTL5]
U.S. Patent Application Publication No. US2018/0120427 A1

SUMMARY

Analyses of the related technology will be given below.

In the related technology described with reference to FIG. 5, there is a restriction to the target direction (direction of arrival) that can be estimated, depending on a frequency and a distance between the beams generated by the sub-arrays.

This is because there is an ambiguity in a phase difference between the sub-array beams, which is an integer multiple of $\pi$. It is assumed, for example, that when the array is divided into the sub-arrays $104_r$ and $104_l$ as illustrated in FIG. 5, a reception signal $R_r(t)$ of the right beam and a reception signal $R_l(t)$ of the left beam are respectively expressed as complex signals in the following equations (3a) and (3b):

$$R_r(t) = A_r(t)\exp[2\pi j\{f_c(t - t_{r0})\}] \quad (3a)$$

$$R_l(t) = A_l(t)\exp[2\pi j\{f_c(t - t_{l0})\}] \quad (3b)$$

where each of $A_r(t)$ and $A_l(t)$ are an amplitude (real value), exp is an exponential function, $j^2 = -1$, $f_c$ is a frequency, $t_{r0}$ is a time of a reflected wave from a target arriving at the sub-array $104_r$ and $t_{l0}$ is a time of a reflected wave from the target arriving at the sub-array $104_l$.

$t_{l0} - t_{r0}$ is a difference in the arrival times of the echo signals from the target.

In this case, the phase difference $\varphi$ between the right and left beams is given as following equation:

$$\varphi = 2\pi\{f_c(t_{l0} - t_{r0})\} = \tan^{-1}\left[\frac{j\{R_r^*(t)R_l(t) - R_r(t)R_l^*(t)\}}{R_r(t)R_l^*(t) + R_r^*(t)R_l(t)}\right] \quad (4)$$

where a superscript * is a complex conjugate operator.

This is derived as follows:
From the formula of the trigonometric function in terms of the exponential functions, we have:

$$\tan x = \frac{\sin x}{\cos x} = \frac{j\{\exp(-jx) - \exp(jx)\}}{\{\exp(jx) + \exp(-jx)\}} \quad (5)$$

the following equation holds.

$$x = \tan^{-1}\left[\frac{j\{\exp(-jx) - \exp(jx)\}}{\{\exp(jx) + \exp(-jx)\}}\right] \quad (6)$$

From the equations (3a) and (3b), by setting $$x = \varphi = 2\pi\{f_c(t_{l0} - t_{r0})\} \quad (7)$$

we find:

$$R_r^*(t)R_l(t) = A_r(t)\exp(-2\pi\{f_c(t - t_{r0})\}) \cdot A_l(t)\exp(2\pi\{f_c(t - t_{l0})\}) =$$
$$A_r(t) \cdot A_l(t)\exp(-2\pi\{f_c(t_{l0} - t_{r0})\}) = A_r(t) \cdot A_l(t)\exp(-jx)$$

$$R_r(t)R_l^*(t) = A_r(t)\exp(2\pi\{f_c(t - t_{r0})\}) \cdot A_l(t)\exp(-2\pi\{f_c(t - t_{l0})\}) =$$
$$A_r(t) \cdot A_l(t)\exp(2\pi\{f_c(t_{l0} - t_{r0})\}) = A_r(t) \cdot A_l(t)\exp(jx)$$

By substituting the right side of the above equation (6) by right sides of the following equations (8a) and (8b), $$\exp(-jx) = \frac{R_r^*(t)R_l(t)}{A_r(t) \cdot A_l(t)} \quad (8a)$$

$$\exp(jx) = \frac{R_r(t)R_l^*(t)}{A_r(t) \cdot A_l(t)} \quad (8b)$$

the above equation (4) is derived.

The direction of arrival $\theta$ of the target is obtained by using the difference in the arrival times of reflections from the target between the right and left beams, as seen from FIG. 5. That is, we find $$\sin\theta = \frac{c(t_{l0} - t_{r0})}{d} \quad (9)$$

where c is a sound velocity in the case of a sonar and is a light velocity in the case of a radar. d is a distance between the sub-array beams. When the reception array is divided into the sub-arrays $104_r$ and $104_l$, d is termed as a distance between the right and left beams. The distance d between the right and left beams is a distance between the centers of the right and left beams of the sub-arrays 104$_r$ and 104$_l$, as illustrated in FIG. 5.

Figure 6A:
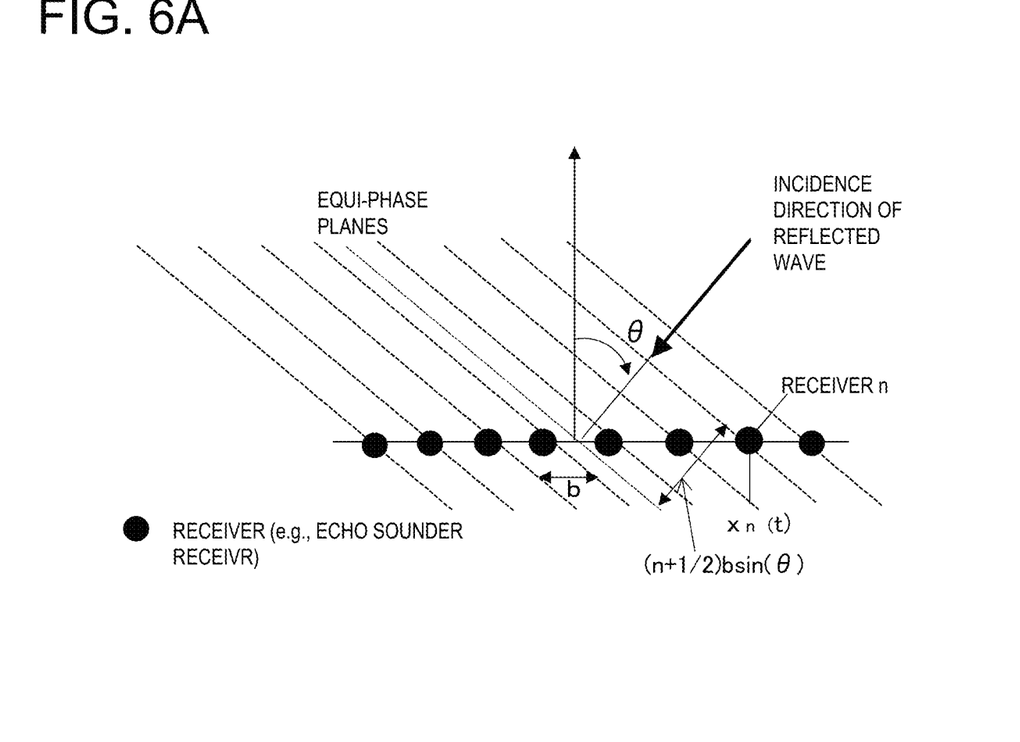
FIG. 6A is a diagram illustrating the related art.

The center of a beam is determined by weighting with respect to a signal that is input to each device for reception of a transducer or the like. This weighting is termed as shading. Adjustment of values of the shading is generally performed in order to adjust a beam width and side lobes of a beam to be generated in the beamforming. Assume that an incident direction of a reflected wave with respect to a normal direction of the reception array is θ, the number of the receivers (echo sounder receivers) is N (which is an even number), and an interval between the respective receivers (echo sounder receivers) is b, as schematically illustrated in FIG. 6A. Then, in a phasing process of outputs of the reception array including a plurality of receivers (echo sounder receivers) configured to receive a reflection wave from a target, an output $x_n(t)$ of each receiver (echo sounder receiver) is multiplied by a shading coefficient $w_n$, and the outputs are added to produce a response output y(t) (output of the phasing process) of the receiver array as expressed by the following equation (10a), where θ is a phase (direction of arrival), c is a sound velocity or light velocity, and $f_c$ is a frequency.

$$y(t) = \sum_{n=-\frac{N}{2}}^{\frac{N}{2}-1} w_n \cdot x_n(t) \exp\left(-j\frac{2\pi f_c}{c}\left(n+\frac{1}{2}\right)b \sin \theta\right) \quad (10a)$$

where $$\sum_{n=-\frac{N}{2}}^{\frac{N}{2}-1} w_n = 1 \quad (10b)$$

From the above equation (9), the following equation holds.

$$(t_{l0} - t_{r0}) = \frac{d}{c}\sin\theta \quad (11)$$

Then, the equation (4) can be transformed to the following equation (12):

$$\tan\varphi = \quad (12)$$

$$\tan\{2\pi f_c(t_{l0} - t_{r0})\} = \tan\left(2\pi f_c \frac{d}{c}\sin\theta\right) = \frac{j\{R_r^*(t)R_l(t) - R_r(t)R_l^*(t)\}}{R_r(t)R_l^*(t) + R_r^*(t)R_l(t)}$$

Since a tangent function tan is a periodic function with a period π, the following holds where n is an integer:

$$\tan\left(2\pi f_c \frac{d}{c}\sin\theta + n\pi\right) = \tan\left(2\pi f_c \frac{d}{c}\sin\theta\right) \quad (13)$$

The above represents ambiguity by integer multiple of π in the tangent function.

The following describes an example where the ambiguity by integer multiple of π in the tangent function tan becomes a problem.

When comparison is made between a case where direction θ=0° and a case where direction θ=4.3° in a sonar that is used under water, for example, assuming that the frequency $f_c$=10 kHz (kilohertz), the sound velocity c=1500 m/sec, and the distance d between the right and left beams=1 m, the following holds:

$$\tan\left(2\pi f_c \frac{d}{c}\sin 0°\right) = \tan\left(2\pi f_c \frac{d}{c}\sin 4.3°\right) = 0 \quad (14)$$

That is, no distinction can be made between the case where the direction θ=0° and the case where the direction θ=4.3°. This does not mean just one problem that a target direction cannot be precisely estimated.

Even when a target is in a beam outside a range in a B Scope which provides an image indicating direction (e.g., azimuth) vs. distance by arranging side by side beams, the target at a base of a main lobe or at a side lobe(s) may be erroneously recognized to be within the range. To take an example, as schematically illustrated in FIG. 6B, false targets may be displayed side by side with a true target.

Figure 6B:
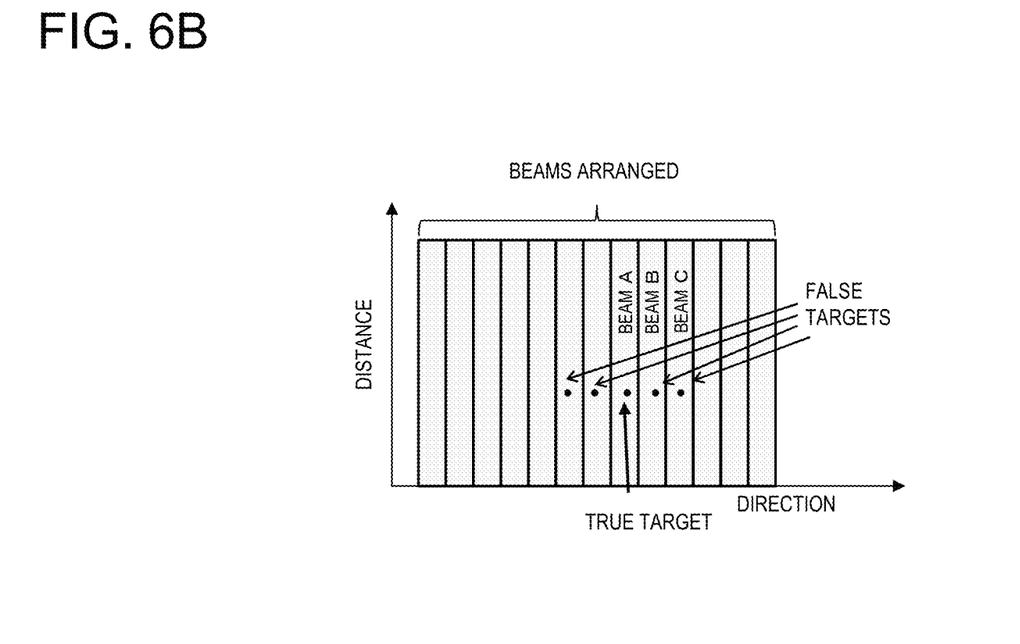
FIG. 6B is a diagram illustrating the related art.

FIG. 6B illustrates an image where the false targets are displayed side by side on the B Scope generated by arranging the beams side by side.

Due to the equation (15) and a restriction of a range of the inverse tangent function $\tan^{-1}$ (arctan) (domain of a tangent function tan) given by the following equation (16a), there is a restriction given by the following equation (17) with respect to a direction θ.

$$d \sin \theta = c(t_{r0} - t_{l0}) \quad (15)$$

$$-\frac{\pi}{2} < \tan^{-1} < \frac{\pi}{2} \quad (16a)$$

equation (16a) indicates that when the range of the inverse tangent function x is in a range as expressed by the following expression (16b) (principal value), $$-\frac{\pi}{2} < x < \frac{\pi}{2} \quad (16b)$$

the following holds:

$$y = \tan x \leftrightarrow x = \tan^{-1} y \quad (16c)$$

$$-\frac{c}{4f_c d} < \sin \theta < \frac{c}{4f_c d} \quad (17)$$

Assuming that the frequency $f_c$=10 kHz, the sound velocity c=1500 m/sec, and the distance d between the right and left beams=1 m, as an example, the following inequality relation (18) holds:

$$-2.149° < \theta < 2.149° \quad (18)$$

The above inequality expression (18) indicates that when a target direction detected is outside the range, the direction is erroneous, as described above.

When a target echo signal has a low SNR (Signal to Noise Ratio), a signal intensity level of an adjacent beam may become low so that a false target may be not noticeable or may not be displayed because the level of the adjacent beam is less than a threshold value, whereas, when the target echo signal has a high SNR, there is a case in which a false target may be displayed.

By reducing the distance d between the right and left sub-array beams (between the centers of the right and left beams), the above-mentioned restriction may be avoided. In the above example (where the frequency $f_c$=10 kHz and the sound velocity c=1500 m/sec), however, by setting the distance d between the right and left beams to d=3.75 cm, we finally can have the following expression:

$$-1 < \sin\theta < 1 \qquad (19)$$

In this case, the distance d between the right and left beams becomes equivalent to a size of each transducer, which is a receiving means in a sonar. The distance d is not realistic (cannot be realized) in an array (such as a line array) which is constituted from a plurality of transducer.

Further, since the distance d between the right and left beams is small, a target direction accuracy is reduced.

Accordingly, the present invention has been devised in view of the above-mentioned issues, and an object of the present invention is to provide an apparatus, a method, and a non-transitory medium that can at least eliminate a restriction regarding an estimable range of direction of arrival which depends on a distance between sub-array beams, to ensure direction accuracy.

According to one aspect of the present invention, there is provided a direction of arrival estimation apparatus comprising:

first and second sub-arrays, each including a plurality of receivers to receive a wave including a reflected wave of a transmission wave from a target, which is transmitted from the direction of arrival estimation apparatus and reflected by the target;

first and second phasing parts that perform phasing of a plurality of reception signals received at the first and second sub-arrays to generate first and second sub-array beams, respectively;

an arrival time difference calculation part that calculates first and second correlations of the reception signals of the first and second sub-array beams at time points including at least first and second time points and performs a predetermined operation on the first and second correlations to find an arrival time difference between arrival times of the reflected wave from the target at the first sub-array and at the second sub-array, based on a result of the predetermined operation on the first and second correlations and a time difference between the first time point and the second time point; and a direction of arrival calculation part that finds a direction of arrival of the target, based on the arrival time difference.

According to one aspect of the present invention, there is provided a direction of arrival estimation method used for an apparatus comprising at least first and second sub-arrays respectively including a plurality of receivers configured to receive reception signals including a reflected wave of a transmission waveform from a target, which is transmitted from the direction of arrival estimation apparatus and reflected by the target, the method comprising:

performing phasing of a plurality of the reception signals received at the first and second sub-arrays to generate first and second sub-array beams, respectively;

calculating first and second correlations of the reception signals of the first and second sub-array beams at time points including at least first and second time points and performing a predetermined operation on the first and second correlations to find an arrival time difference between arrival times of the reflected wave from the target at the first sub-array and at the second sub-array, based on a result of the predetermined operation on the first and second correlations and a time difference between the first time point and the second time point; and finding a direction of arrival of the target, based on the arrival time difference.

According to one aspect of the present invention, there is provided a non-transitory computer readable medium storing a program causing a computer included in an apparatus including at least first and second sub-arrays respectively including a plurality of receivers configured to receive reception signals including a reflected wave of a transmission wave from a target, which is transmitted from the direction of arrival estimation apparatus and reflected by the target, to execute processing comprising:

performing phasing of a plurality of the reception signals received at the first and second sub-arrays to generate first and second sub-array beams, respectively;

calculating first and second correlations of the reception signals of the first and second sub-array beams at time points including at least first and second time points and performing a predetermined operation on the first and second correlations to find an arrival time difference between arrival times of the reflected wave from the target at the first sub-array and at the second sub-array, based on a result of the predetermined operation on the first and second correlations and a time difference between the first time point and the second time point; and finding a direction of arrival of the target, based on the arrival time difference.

The present invention makes it possible to at least eliminate a restriction regarding an estimable range of direction of arrival which depends on a distance between sub-array beams, to ensure direction accuracy.

DETAILED DESCRIPTION

Figure 1:
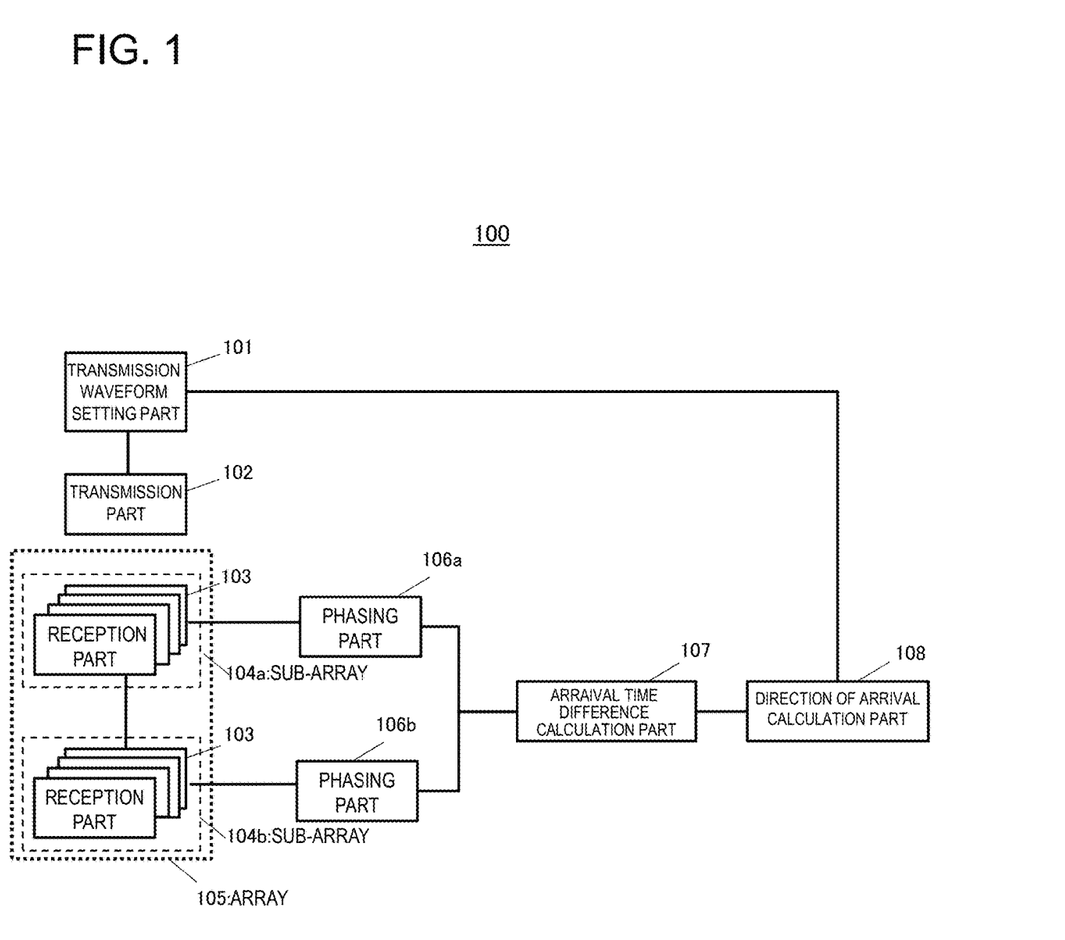
FIG. 1 is a diagram illustrating an arrangement of a first example embodiment of the present invention.

First, example embodiments of the present invention will be described with reference to the drawings. FIG. 1 is a diagram illustrating an arrangement of a first example embodiment of the present invention. Referring to FIG. 1, a direction of arrival (DOA) estimation apparatus (system) 100 includes a transmission waveform setting part 101 whereby a user sets a transmission waveform in advance, a transmission part 102 configured to transmit a wave(s) of the transmission waveform that has been specified, and a plurality of reception parts (echo sounder receivers) 103 configured to receive a waves including a reflected wave from a target. The plurality of reception parts 103 constitute an array (echo sounder receiver array) 105 which includes a plurality of sub-arrays (sub-arrays) 104. Each sub-array 104 is constituted from a predefined number (a plurality) of the reception parts 103 that are close to one another in distance. In the example in FIG. 1, the array 105 includes two sub-arrays 104.

The direction of arrival estimation apparatus (system) 100 includes, for each sub-array 104, a phasing part 106 configured to perform a process including aligning phases of reception signals received at the reception parts 103 of the sub-array 104 to generate a sub-array beam. The direction of arrival estimation apparatus (system) 100 further includes an arrival time difference calculation part 107 configured to calculate correlations between the respective reception signals of the sub-array beams of the two sub-arrays 104 at a plurality of times, and calculate a difference between times of the reflected waves arriving at the two sub-arrays 104 from the target, based on an operation on the correlations at the plurality of times, and a direction of arrival calculation part 108 configured to calculate (estimate) a direction of arrival of the target based on the difference between the arrival times of the reflected waves from the target arriving at the two sub-arrays 104. It is noted that the arrival time difference calculation part 107 calculates a phase difference of the reflected waves from the target between the sub-arrays 104. These respective parts may be configured as a unit apparatus (direction of arrival estimation apparatus) constituted from a single unit, may be configured as two apparatuses (units) of a transmission apparatus (including the transmission waveform setting part 101 and the transmission part 102, for example) and a reception apparatus (including sub-arrays 104$_a$ and 104$_b$, phasing parts 106$_a$ and 106$_b$, the arrival time difference calculation part 107, and the direction of arrival calculation part 108, for example), or may be configured as a system (direction of arrival estimation system) constituted from three or more units. The following describes an outline of a process of each part.

When a user sets a transmission waveform using a keyboard (not illustrated) or the like, the transmission waveform setting part 101 stores the transmission waveform that has been set. It may be so configured that the transmission wave setting part 101 specifies modulation such as frequency modulation or phase modulation.

The transmission part 102 includes a transmitter and electric circuits (electronic circuits) to convert a digital signal to an analog signal. In the case of a sonar, for example, the transmission part 102 includes a transducer constituted from a piezoelectric element or the like which converts an electronic signal (electrical energy) to an acoustic signal (acoustic energy). After the electric circuit has converted the transmission waveform stored in the transmission waveform setting part 101 to an analog signal (electronic signal), power of the analog signal is amplified, and a sound wave is transmitted into sea from the transducer. In the case of a radar, for example, the transmission part 102 includes an antenna. The transmission part 102 converts the transmission waveform stored in the transmission waveform setting part 101 in the form of digital codes to an analog signal (electronic signal) using an analog-to-digital converter or the like, mixes the analog signal with a local oscillation signal using a mixer, thus performing frequency-conversion to an RF signal. Power of the RF signal is amplified, so that a radio wave is emitted into air from the antenna.

Each reception part 103 includes a receiver (echo sounder receiver) and an electric circuit (electronic circuit) such as an analog-to-digital converter to convert an analog signal output from the receiver to a digital signal. In the case of the sonar, for example, the reception part 103 includes a transducer (transducer) constituted from a piezoelectric element or the like to convert a sound wave from under water to an electronic signal (analog signal), converts, into the digital signal, the electronic signal (analog signal) obtained by the conversion of a sound wave under water including a reflection wave from a target which reflects a wave transmitted from the transmission part 102 and then received by the transducer, and outputs a digital signal. In the case of the radar, for example, the reception part 103 includes an antenna. The antenna receives a reflected signal. An LNA (Low Noise Amplifier: low noise amplifier) performs low noise amplification on the reception signal from the antenna. The resulting signal is mixed with a local oscillation signal by a mixer to generate a beat frequency (intermediate frequency) output, which is converted by an analog-to-digital converter to a digital signal for output.

Each of two sub-arrays 104$_a$ and 104$_b$ is constituted from the predefined number (a plurality) of the reception parts 103 that are close to one another in distance. When no particular distinction does not need to be made between the sub-arrays 104$_a$ and 104$_b$ for description, the sub-arrays 104$_a$ and 104$_b$ are referred to as the sub-arrays 104.

When all the reception parts 103 are linearly arranged as illustrated in FIG. 5, for example, the array 105 is constituted from all the reception parts 103. Generally, the array 105 is referred to as a "line array", a "linear array", or the like. This array 105 in the form of a straight line is divided into two parts at a center thereof. A set of the reception parts 103 on the right and left sides equally divided into two parts can be set to the sub-arrays 104. This array 105 in the form of the straight line is horizontally disposed and the sub-array 104$_a$ on the right side with respect to the target is referred to as a right sub-array, and the sub-array 104$_b$ on the left side with respect to the target is referred to as a left sub-array, for example.

The phasing parts 106$_a$ and 106$_b$ are respectively provided in association with the sub-arrays 104$_a$ and 104$_b$, and each of the phasing parts 106$_a$ and 106$_b$ aligns phases of signals received at the reception parts 103 for each sub-array 104 to generate a sub-array beam. When no particular distinction does not need to be made between the phasing parts 106$_a$ and 106$_b$ for description, the phasing parts 106$_a$ and 106$_b$ are referred to as phasing parts 106.

In the above example described with reference to FIG. 5, for example, the beam generated for a right sub-array 104$_r$ (the sub-array 104$_a$ in FIG. 1) of the array in the form of a straight line, which is horizontally disposed, will be referred to as a "right beam", while the beam generated for a left sub-array 104$_l$ (the sub-array 104$_b$ in FIG. 1) will be referred to as a "left beam". Any known method may be employed for beam generation.

In this example embodiment, as a transmission signal, an LFM (Linear Frequency Modulation: linear frequency modulation) transmission waveform (pulse compression waveform obtained by linear chirping) is used which is expressed as follows:

$$S_t(t) = \exp\left\{2\pi j\left(f_0 t + \frac{\xi t^2}{2}\right)\right\} \tag{20a}$$

where an amplitude is set to 1, and a length (pulse length) of the transmission signal is set to T.

By performing time-differentiation on a phase $\phi(t)$:

$$\phi(t) = 2\pi\left(f_0 t + \frac{\xi t^2}{2}\right) \tag{20b}$$

we have an instantaneous frequency f(t) given by the equation (20c):

$$f(t) = \left(\frac{1}{2\pi}\right)\frac{d}{dt}\phi(t) = f_0 + \xi t \quad (20c)$$

When a frequency change rate (chirp rate) $\xi$ is positive, the instantaneous frequency f(t) linearly increases from a sweep start frequency $f_0$ at time t=0 until time T (where a sweep end frequency=$f_0+\xi T$). When the frequency change rate (chirp rate) is negative, the instantaneous frequency f(t) linearly decreases from the sweep start frequency $f_0$ at time t=0 until time T. It is noted that in the equations (20a) and (20b), a phase $\phi(0)$ at time t=0, which is an initial phase, is set to 0.

Here, it is assumed that the transmission signal of the equation (20a) was transmitted from the transmission part 102 and an echo from a target has arrived at the right beam at time t=$t_{r0}$. In this case, a reception signal $S_r(t)$ of the right beam is expressed by the following equation (21a), where $A_r(t)$ is an amplitude (real value):

$$S_r(t) = A_r(t)\exp\left[2\pi j\left\{f_0(t-t_{r0}) + \frac{\xi(t-t_{r0})^2}{2}\right\}\right] \quad (21a)$$

When it is assumed that an echo from the target has arrived at the left beam at time t=$t_{l0}$, a reception signal $S_l(t)$ of the left beam is expressed by the following equation (21b), where $A_l(t)$ denotes an amplitude (real value):

$$S_l(t) = A_l(t)\exp\left[2\pi j\left\{f_0(t-t_{l0}) + \frac{\xi(t-t_{l0})^2}{2}\right\}\right] \quad (21b)$$

The arrival time difference calculation part 107 calculates multiplication (product) of the reception signal $S_r(t)$ of the right beam from the phasing part 106$_a$ and a complex conjugate of the reception signal $S_l(t)$ of the left beam from the phasing part 106$_b$.

The result of complex conjugate multiplication is given by the following equation (22):

$$S_r(t)S_l^*(t) = \quad (22)$$
$$A_r(t)A_l(t)\exp\left[2\pi j\left\{f_0(t_{l0}-t_{r0}) - \xi(t_{r0}-t_{l0})t + \frac{\xi(t_{r0}^2-t_{l0}^2)}{2}\right\}\right]$$

This result of the multiplication is referred to as a "sub-array correlation". The arrival time difference calculation part 107 sequentially calculates and stores the "sub-array correlation in a storage part (not illustrated).

The arrival time difference calculation part 107 calculates a product of a sub-array correlation $\{S_r(t_1)S_l^*(t_1)\}$ at time $t_1$ and a complex conjugate of a sub-array correlation $\{S_r(t_2)S_l^*(t_2)\}$ at time $t_2$ and calculates a product of a complex conjugate of the sub-array correlation $\{S_r(t_1)S_l^*(t_1)\}$ at time $t_1$ and the sub-array correlation $\{S_r(t_2)S_l^*(t_2)\}$ at time $t_2$.

$$\{S_r(t_1)S_l^*(t_1)\}\{S_r(t_2)S_l^*(t_2)\}^* = A_r(t_1)A_l(t_1)A_r(t_2)A_r(t_2)$$
$$\exp\{2\pi j\xi(t_{r0}-t_{l0})(t_2-t_1)\} \quad (23a)$$

$$\{S_r(t_1)S_l^*(t_1)\}^*\{S_r(t_2)S_l^*(t_2)\} = A_r(t_1)A_l(t_1)A_r(t_2)A_r(t_2)$$
$$\exp\{-2\pi j\xi(t_{r0}-t_{l0})(t_2-t_1)\} \quad (23b)$$

Accordingly, from the equation (5), the following equation holds:

$$j\left[\frac{\{S_r(t_1)S_l^*(t_1)\}^*\{S_r(t_2)S_l^*(t_2)\}-}{\{S_r(t_1)S_l^*(t_1)\}\{S_r(t_2)S_l^*(t_2)\}^*}\right] = \tan\{2\pi\xi(t_{r0}-t_{l0})(t_2-t_1)\} \quad (24)$$

A difference $t_{l0}-t_{r0}$ between times when the echo from the target arrives at the right beam of the sub-array 104$_a$ and when the echo from the target arrives at the left beam of the sub-array 104$_b$ is given by the following equation (25), based on results of the calculations of the sub-array correlations at time $t_1$ and time $t_2$:

$$t_{l0}-t_{r0} = \frac{1}{2\pi\xi(t_1-t_2)} \quad (25)$$
$$\tan^{-1}\left[\frac{j\left[\frac{\{S_r(t_1)S_l^*(t_1)\}^*\{S_r(t_2)S_l^*(t_2)\}-}{\{S_r(t_1)S_l^*(t_1)\}\{S_r(t_2)S_l^*(t_2)\}^*}\right]}{\{S_r(t_1)S_l^*(t_1)\}\{S_r(t_2)S_l^*(t_2)\}^* + \{S_r(t_1)S_l^*(t_1)\}^*\{S_r(t_2)S_l^*(t_2)\}}\right]$$

Assuming that the frequency $f_c$ is set to a center frequency (=(sweep start frequency+sweep end frequency)/2) of the transmission waveform, for example, the arrival time difference calculation part 107 may calculate a phase difference between reflected wave signals from the target at the sub-arrays 104$_a$ and 104$_b$ in FIG. 1, using:

$$2\pi f_c(t_{l0}-t_{r0}) \quad (26)$$

The above equation (9) regarding the direction of arrival θ is here listed again:

$$\sin\theta = \frac{c(t_{l0}-t_{r0})}{d} \quad (27)$$

where c is s sound velocity in the case of the sonar and is a light velocity in the case of the radar, and d is a distance between sub-array beams (distance between sub-arrays).

When the right side of the equation (25) is substituted into the $t_{l0}-t_{r0}$ in the equation (27), the following equation (28) holds:

$$\sin\theta = \frac{c(t_{l0}-t_{r0})}{d} = \quad (28)$$
$$\frac{c}{2\pi\xi(t_1-t_2)d}\tan^{-1}\left[\frac{j\left[\frac{\{S_r(t_1)S_l^*(t_1)\}^*\{S_r(t_2)S_l^*(t_2)\}-}{\{S_r(t_1)S_l^*(t_1)\}\{S_r(t_2)S_l^*(t_2)\}^*}\right]}{\{S_r(t_1)S_l^*(t_1)\}\{S_r(t_2)S_l^*(t_2)\}^* + \{S_r(t_1)S_l^*(t_1)\}^*\{S_r(t_2)S_l^*(t_2)\}}\right]$$

The direction of arrival calculation part 108 can obtain a direction of arrival θ of a target by substituting, into an inverse sine function $\sin^{-1}$, a value obtained by dividing the result of multiplication of the arrival time difference $t_{l0}-t_{r0}$ of the echoes from the target and the velocity c of the reflected wave by the distance d between the right and left sub-array beams. That is, the direction of arrival calculation part 108 obtains a value of the right side in the second row of the equation (28) which involves:

a value of the inverse tangent function of a result of an operation (operation in square brackets [ ] of $\tan^{-1}$ in the equation (28)) in which a first product of the sub-array correlation $\{S_r(t_1)S_l^*(t_1)\}$ at time $t_1$ and a complex conjugate of the sub-array correlation $\{S_r(t_2)S_l^*(t_2)\}$ at time $t_2$, which is $\{S_r(t_1)S_l^*(t_1)\}$ $\{S_r(t_2)S_l^*(t_2)\}^*$, and a second product of a complex conjugate of the sub-array correlation $\{S_r(t_1)S_l^*(t_1)\}$ at time $t_1$ and the sub-array correlation $\{S_r(t_2)S_l^*(t_2)\}$ at time $t_2$, which is $\{S_r(t_1)S_l^*(t_1)\}^*\{S_r(t_2)S_l^*(t_2)\}$, are added in a denominator, while the first product is subtracted from the second product in a numerator;

the information on the transmission wave (frequency change rate ξ in the equation (28));

the distance d between the right and left sub-array beams;

a time difference $(=t_1-t_2)$; and the sound or light velocity c.

The direction of arrival calculation part 108 calculates the value of the inverse $\sin^{-1}$ of the value of the right side of the equation (28) to calculate the direction θ of the target. Herein, the sound velocity or the light velocity c and the distance d between the sub-arrays are given in advance. Times $t_1$ and $t_2$ can be arbitrarily specified by a user.

It may be so arranged that the arrival time difference calculation part 107 calculates the sub-array correlation $\{S_r(t_1)S_l^*(t_1)\}$ at time $t_1$ and the sub-array correlation $\{S_r(t_2)S_l^*(t_2)\}$ at time $t_2$ and stores the sub-array correlations in the storage part (not illustrated), the direction of arrival calculation part 108 receives the sub-array correlation $\{S_r(t_1)S_l^*(t_1)\}$ at time $t_1$ and the sub-array correlation $\{S_r(t_2)S_l^*(t_2)\}$ at time $t_2$ that have been stored in the storage part (not illustrated) of the arrival time difference calculation part 107 and then calculates the above equations (23a), (23b), and (25) to find the direction of arrival of the target, based on the above equation (28). It is noted that as an alternative arrangement, the arrival time difference calculation part 107 and the direction of arrival calculation part 108 may be configured as one unit (processing unit).

When the inequality expression (16a) regarding the range of an inverse tangent function $\tan^{-1}$ is applied to the inverse tangent function $\tan^{-1}$ in the equation (28), the following holds:

$$-\frac{c}{4\xi(t_1-t_2)d} < \sin\theta < \frac{c}{4\xi(t_1-t_2)d} \quad (29)$$

The difference $(t_1-t_2)$ between time $t_1$ and time $t_2$ in the above inequality expression (29) can be arbitrarily set. Therefore, a degree of freedom is high with respect to direction of arrival estimation. That is, a restriction with respect to a direction estimable range which depends on a distance between sub-array beams can be at least eliminated and accuracy of direction of arrival estimation can be ensured.

When the pulse length T of the transmission waveform is 1 second and a frequency amplitude (difference between the sweep start frequency and the sweep end frequency) is 1 kHz, for example, ξ=1 kHz/second. It is assumed that the sound or light velocity c=1500 m/second and the distance d between the right and left beams=1 m, and $(t_1-t_2)=0.25$ seconds (30)

In this case, the restriction to the direction of arrival, based on the above inequality expression (29) becomes as follows:

$-1.5 < \sin\theta < 1.5$ (31)

An arbitrary direction of arrival can be estimated without unambiguity.

According to this example embodiment which uses the inverse trigonometric functions, by holding a numeral table or the like in advance in a storage part, a processing load can be kept low. As a result, the direction of arrival estimation apparatus with low processing load can be mounted on a drone or the like which is not equipped with a large computational capability.

In the present example embodiment, the pulse waveform (LFM pulse compression waveform, but not limited to LFM) is used as the transmission waveform. There is no limitation on the pulse length. Therefore, the example embodiment described above can also be applied to a sonar or a radar that uses a continuous wave (such as FMCW (Frequency Modulation Continuous Wave)). The example embodiment described above can also be applied to a sensor (whose reception part is constituted from sub-arrays) configured to sense infrared light, a light wave or the like.

Figure 2:
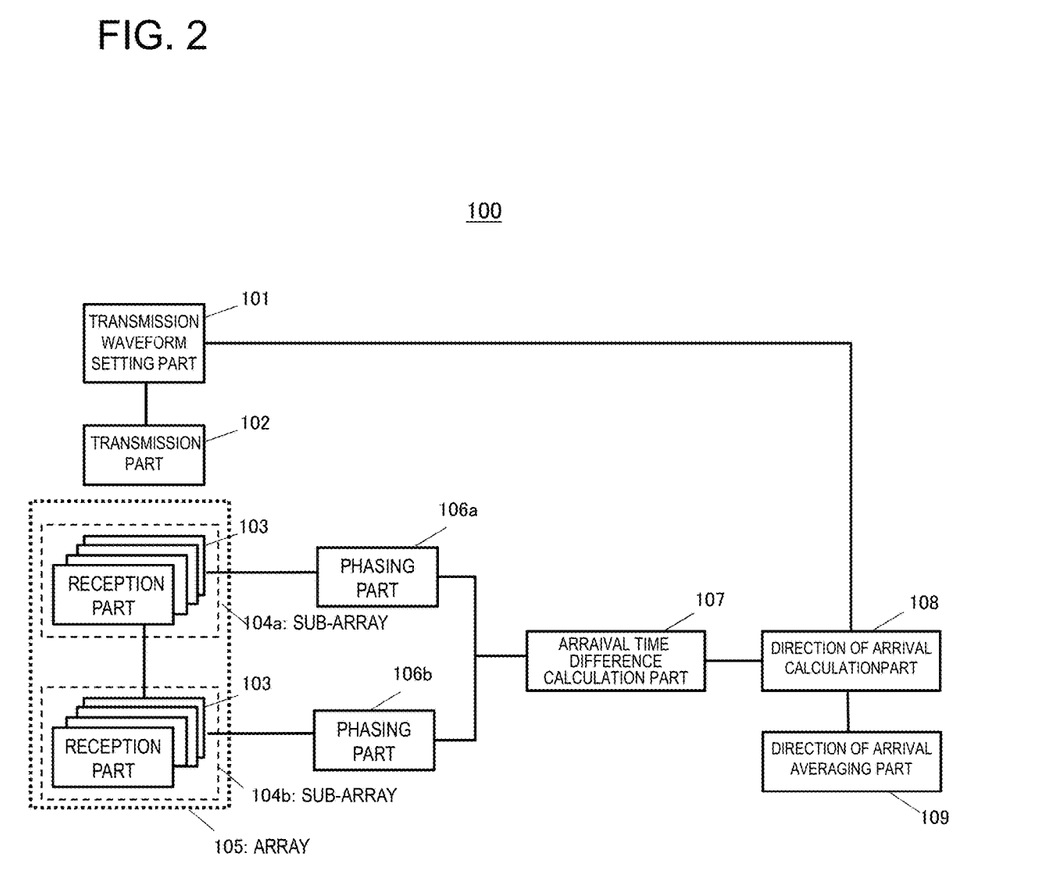
FIG. 2 is a diagram illustrating an arrangement of a second example embodiment of the present invention.

FIG. 2 is a diagram illustrating an arrangement of a second example embodiment. Referring to FIG. 2, the second example embodiment includes a direction averaging part 109, in addition to the configuration of the first example embodiment.

By storing, in a storage part not illustrated, directions obtained at three or more different times with respect to sub-arrays 104 and averaging the directions by the direction averaging part 109, direction estimation accuracy of a target can be improved.

To take an example, assuming that a direction of arrival of the target calculated using the equation (28) based on results of complex conjugate multiplications of $\{S_r(t_1)S_l^*(t_1)\}^*\{S_r(t_2)S_l^*(t_2)\}$ and $\{S_r(t_1)S_l^*(t_1)\}$ $\{S_r(t_2)S_l^*(t_2)\}^*$ which are calculated using sub-array correlations $\{S_r(t_1)S_l^*(t_1)\}$ and $\{S_r(t_2)S_l^*(t_2)\}$ of reception signals of right and left beams obtained at time $t_1$ and time $t_2$ is $\theta_A$, and a direction of arrival of the target calculated from the 0 (28) using results of complex conjugate multiplications of $\{S_r(t_3)S_l^*(t_3)\}^*\{S_r(t_4)S_l^*(t_4)\}$ and $\{S_r(t_3)S_l^*(t_3)\}$ $\{S_r(t_4)S_l^*(t_4)\}^*$ calculated using sub-array correlations $\{S_r(t_3)S_l^*(t_3)\}$ and $\{S_r(t_4)S_l^*(t_4)\}$ of reception signals of right and left beams obtained at time $t_3$ and time $t_4$ is $\theta_B$, the direction averaging part 109 outputs, as the direction of arrival of the target, the following average between the $\theta_A$ and the $\theta_B$:

$$\frac{\theta_A+\theta_B}{2} \quad (32)$$

Alternatively, as an example of the directions obtained at the three or more times, the sub-array correlations of the reception signals of the right and left beams obtained at time $t_1$, $t_2$, and $t_3$ are used. When the direction of arrival of the target estimated from the equation (28) based on the results of the complex conjugate multiplications of $\{S_r(t_1)S_l^*(t_1)\}^*\{S_r(t_2)S_l^*(t_2)\}$ and $\{S_r(t_1)S_l^*(t_1)\}$ $\{S_r(t_2)S_l^*(t_2)\}^*$ calculated using the sub-array correlations $\{S_r(t_1)S_l^*(t_1)\}$ and $\{S_r(t_2)S_l^*(t_2)\}$ of the reception signals of the right and left beams obtained at time $t_1$ and $t_2$ is set to $\theta_A$, and when a direction of arrival of the target estimated from the equation (28) based on results of complex conjugate multiplications of $\{S_r(t_2)S_l^*(t_2)\}^*\{S_r(t_3)S_l^*(t_3)\}$ and $\{S_r(t_2)S_l^*(t_2)\}$ $\{S_r(t_3)S_l^*(t_3)\}^*$ calculated using the sub-array correlations $\{S_r(t_2)S_l^*(t_2)\}$ and $\{S_r(t_3)S_l^*(t_3)\}$ of the reception signals of the right and left beams obtained at time $t_2$ and time $t_3$ is set to $\theta_B$, the direction averaging part 109 outputs, as the direction of arrival of the target, an average calculated from the equation (32) indicating the average of the $\theta_A$ and the $\theta_B$. Alternatively, the direction averaging part 109 may calculates, as the direction of arrival of the target, an average between the direction of arrival of the target estimated from the equation (28) based on the results of the complex conjugate multiplications of the sub-array correlations of the reception signals of the right and left beams obtained at time $t_1$ and time $t_2$ and a direction of arrival of the target estimated from the equation (28) based on results of complex conjugate multiplications of the sub-array correlations of the reception signals of the right and left beams obtained at time $t_1$ and time $t_3$.

Figure 3:
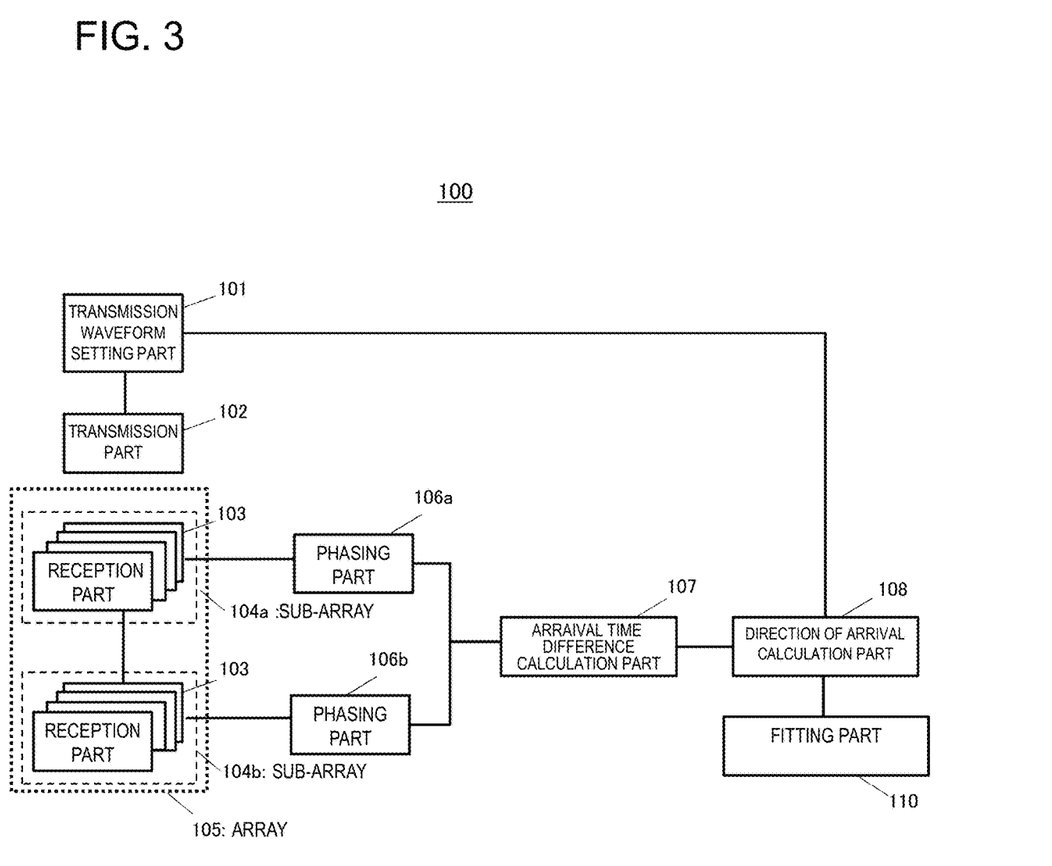
FIG. 3 is diagram illustrating an arrangement of a third example embodiment of the present invention.

FIG. 3 is a diagram illustrating an arrangement of a third example embodiment of the present invention. Referring to FIG. 3, a direction of arrival estimation apparatus (system) 100 in the third example embodiment includes a fitting part 110, in addition to the configuration of the first example embodiment.

The fitting part 110 stores directions $\theta i$ (i=1, . . . m: m>=3) obtained at different time points that are three or more, and performs fitting of a straight line or a curve (such as fitting the straight line by linear regression or the like or polynomial curve fitting) to these directions $\theta i$ (i=1, . . . m: m>3), which contributes to improvement in direction estimation accuracy of a target. Further, The fitting part 110 can track a time variant direction of arrival of the target.

Figure 4:
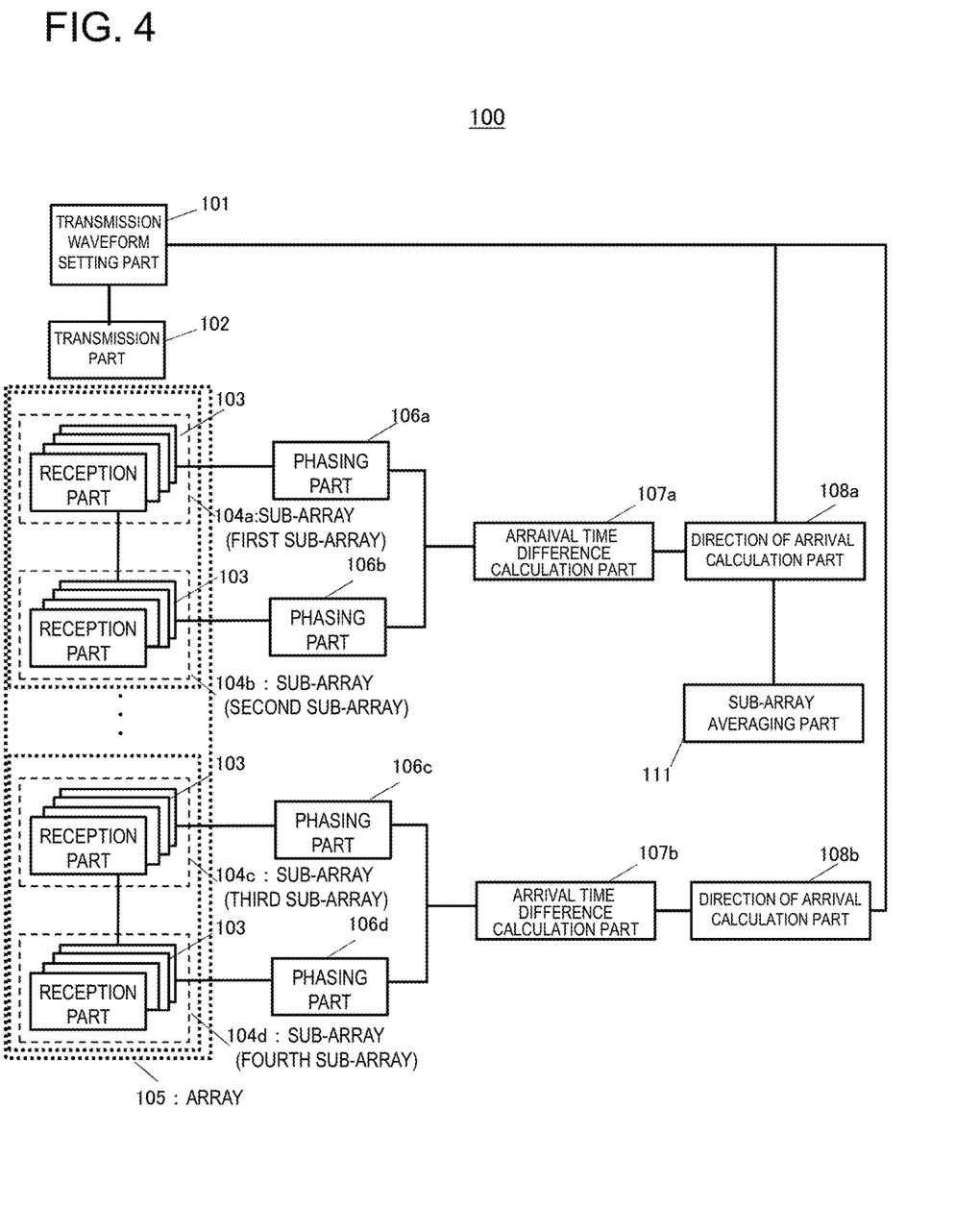
FIG. 4 is a diagram illustrating an arrangement of a fourth example embodiment of the present invention.

FIG. 4 is a diagram illustrating an arrangement of a fourth example embodiment of the present invention. Referring to FIG. 4, a direction of arrival estimation apparatus (system) 100 in the fourth example embodiment includes a plurality of sub-arrays that are three or more sub-arrays, and includes a sub-array averaging part 111 configured to calculate and store a direction of arrival of a target for each combination of two of the sub-arrays and to average directions that have been stored. Since the sub-array averaging part 111 performs estimation of direction of arrival of a target using the three or more sub-arrays, direction estimation accuracy can be improved more than in a case where there are only two sub-arrays. Referring to FIG. 4, reception signals from a first sub-array $104_a$ and a second sub-array $104_b$ are respectively subjected to phasing addition by phasing parts $106_a$ and $106_b$. Then, an arrival time difference calculation part $107_a$ and direction of arrival calculation part $108_a$ calculate a first direction $\theta_1$. Reception signals from a third sub-array $104_c$ and a fourth sub-array $104_d$ are respectively subjected to phasing addition by phasing parts $106_c$ and $106_d$. Then, an arrival time difference calculation part $107_b$ and direction of arrival calculation part $108_b$ calculate a second direction $\theta_2$. The sub-array averaging part 111 calculates, as the direction of arrival of the target, a value as follows obtained by calculating an average between the first direction $\theta_1$. calculated by the direction of arrival calculation part $108_a$ and the second direction $\theta_2$. calculated by the direction of arrival calculation part $108_b$:

$$\frac{\theta_1 + \theta_2}{2} \quad (33)$$

It may be so configured, for example, that three sub-arrays (such as the sub-arrays $104_a$, $104_b$ and $104_c$) are provided in FIG. 4, the direction of arrival calculation part $108_a$ calculates the first direction based on reception signals at two sub-arrays $104_a$ and $104_b$, the direction of arrival calculation part $108_b$ calculates a second direction based on reception signals at two sub-arrays $104_b$ and $104_c$, and the sub-array averaging part 111 calculates, as the direction of arrival of the target, a value obtained by calculating an average between the first direction calculated by the direction of arrival calculation part $108_a$ and the second direction calculated by the direction of arrival calculation part $108_b$.

Figure 7:
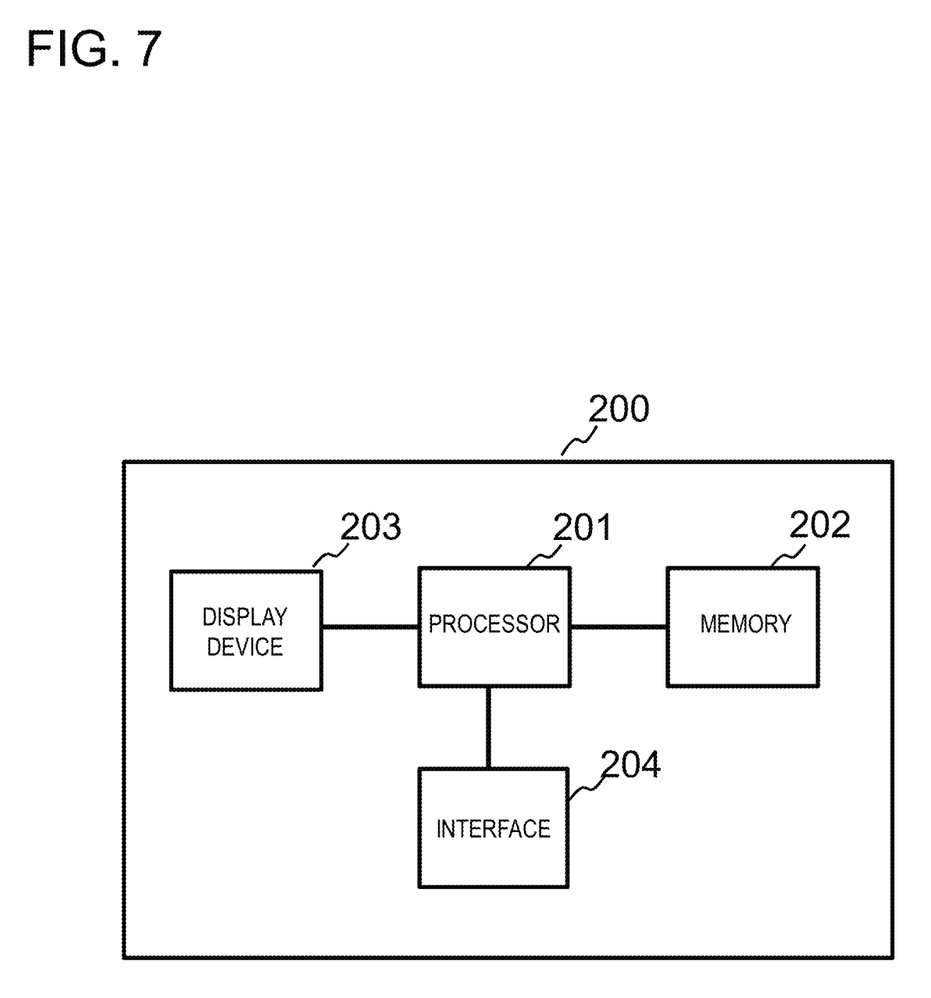
FIG. 7 is a diagram illustrating an arrangement of a fifth example embodiment.

FIG. 7 is a diagram illustrating a fifth example embodiment of the present invention, and is a diagram illustrating a configuration when the direction of arrival estimation apparatus is implemented in a computer apparatus 200. Referring to FIG. 7, the computer apparatus 200 includes a processor 201, a memory 202 such as a semiconductor memory (or that may be an HDD (Hard Disk Drive) or the like) that is a RAM (Random Access Memory), a ROM (Read Only Memory), or an EEPROM (Electrically Erasable Programmable Read-Only Memory), a display device 203, and an interface 204 (bus interface) that is connected to the transmission part 102 and the reception part 103 in FIG. 1. The processor 201 may be a DSP (Digital Signal Processor). By executing a program stored in the memory 202, the processor 201 executes processes of the phasing part 106, the arrival time difference calculation part 107, and the direction of arrival calculation part 108 in FIG. 1. Alternatively, the processor 201 may execute processes of the direction averaging part 109 and the fitting part 110. The memory 202 may be used as the storage part (not illustrated in each of FIGS. 1 to 4) for the arrival time difference calculation part 107, the direction of arrival calculation part 108, and the transmission waveform setting part 101, and so on.

Each disclosure of the above-listed Patent Literatures 1 to 5 is incorporated herein by reference. Modification and adjustment of each example embodiment and each example are possible within the scope of the overall disclosure (including claims) of the present invention and based on the technical concept of the present invention. Various combinations and selections of various disclosed elements (including each element in each claim, each element in each example, each element in each drawing, and the like) are possible within the scope of the claims of the present invention. That is, the present invention naturally includes various variations and modifications that could be made by those skilled in the art according to the overall disclosure including the claims and the technical concept.

What is claimed is:
1. A direction of arrival estimation apparatus comprising:
first and second sub-arrays, each including a plurality of receivers configured to receive a wave including a reflected wave of a transmission wave from a target, which is transmitted from the direction of arrival estimation apparatus and reflected by the target;
first and second phasing parts configured to perform phasing of a plurality of reception signals received at the first and second sub-arrays to generate first and second sub-array beams, respectively;
an arrival time difference calculation part configured to calculate a first correlation $\{S_r(t_1)S_l^*(t_1)\}$ (where * is a complex conjugate operator) of reception signals $S_r(t_1)$ and $S_l(t_1)$ of the first and second sub-array beams at a first time point $t_1$ and a second correlation $\{S_r(t_2)S_l^*(t_2)\}$ of reception signals $S_r(t_2)$ and $S_l(t_2)$ of the first and second sub-array beams at a second time point $t_2$,
wherein the arrival time difference calculation part is configured to calculate a first complex conjugate product $\{S_r(t_1)S_l^*(t_1)\}^*\{S_r(t_2)S_l^*(t_2)\}$ of the first and second correlations and a second complex con- jugate product $\{S_r(t_1)S_l^*(t_1)\}$ $\{S_r(t_2)S_1^*(t_2)\}^*$ of the first and second correlations, and wherein the arrival time difference calculation part is configured to find an arrival time difference between arrival times of the reflected wave from the target at the first sub-array and at the second sub-array, using a result of an inverse trigonometric operation on a value obtained by dividing a difference between the first and second complex conjugate products by a sum of the first and second complex conjugate products, a distance between the first and second sub-arrays beams, a frequency change rate of the transmission wave, and a time difference between the first time point and the second time point; and a direction of arrival calculation part configured to find a direction of arrival of the target, using the arrival time difference.

2. The direction of arrival estimation apparatus according to claim 1, wherein the arrival time difference calculation part is configured to calculate and store first to third correlations of the reception signals of the first and second sub-array beams at time points including at least first to third time points, and wherein the direction of arrival estimation apparatus further includes:

a direction averaging part configured to average at least two directions of arrivals (DOAs) calculated using combinations of two pairs of the correlations selected from the first to third correlations at the time points including at least the first to third time points.

3. The direction of arrival estimation apparatus according to claim 1, further comprising:

a fitting part configured to perform fitting of a straight line or a curve to a plurality of directions of arrivals (DOAs) calculated using the first to third correlations of the reception signals of the first and second sub-array beams at the time points including at least the first to third time points.

4. The direction of arrival estimation apparatus according to claim 1, further comprising:

at least a third sub-array, wherein the arrival time difference calculation part and the direction of arrival calculation part are configured to calculate at least two directions of arrivals (DOAs), for respective different combinations of two sub-arrays among the first to third sub-arrays, and wherein the direction of arrival estimation apparatus comprises a sub-array averaging part configured to calculate an average of the at least two directions of arrivals (DOAs).

5. The direction of arrival estimation apparatus according to claim 1, wherein the direction of arrival calculation part is configured to calculate the direction of arrival of the target, using the arrival time difference, a distance between the first and second sub-array beams, and a reflected wave velocity.

6. A direction of arrival estimation apparatus comprising:

first and second sub-arrays, each including a plurality of receivers configured to receive a wave including a reflected wave of a transmission wave from a target, which is transmitted from the direction of arrival estimation apparatus and reflected by the target;

first and second phasing parts configured to perform phasing of a plurality of reception signals received at the first and second sub-arrays to generate first and second sub-array beams, respectively;

an arrival time difference calculation part configured to calculate first and second correlations of reception signals of the first and second sub-array beams at time points including at least first and second time points and perform a predetermined operation on the first and second correlations to find an arrival time difference between arrival times of the reflected wave from the target at the first sub-array and at the second sub-array, using on a result of the predetermined operation on the first and second correlations and a time difference between the first time point and the second time point; and a direction of arrival calculation part configured to find a direction of arrival of the target, using the arrival time difference, wherein the transmission wave has a linear frequency modulation (LFM) waveform with a frequency change rate $\xi$, wherein a direction of arrival calculation part is configured to derive the direction of arrival of the target $\theta$ from the following equation:

$$\sin\theta = \frac{c(t_{l0} - t_{r0})}{d}$$

wherein c is the reflected wave velocity, wherein d is a distance between the first and second sub-array beams, wherein $t_{l0}-t_{r0}$ is the arrival time difference between arrival times of the reflected wave from the target at the first sub-array and at the second sub-array and given by:

$$t_{l0} - t_{r0} = \frac{1}{2\pi\xi(t_1 - t_2)}$$
$$\tan^{-1}\left[\frac{j[\{S_r(t_1)S_l^*(t_1)\}^*\{S_r(t_2)S_l^*(t_2)\} - \{S_r(t_1)S_l^*(t_1)\}\{S_r(t_2)S_l^*(t_2)\}^*]}{\{S_r(t_1)S_l^*(t_1)\}\{S_r(t_2)S_l^*(t_2)\}^* + \{S_r(t_1)S_l^*(t_1)\}^*\{S_r(t_2)S_l^*(t_2)\}}\right]$$

wherein $\xi$ is the frequency change rate, wherein $t_1-t_2$ is the time difference between the first time point $t_1$ and the second time point $t_2$, wherein $\tan^{-1}$ is an inverse tangent (arctangent) function, wherein $j^2=-1$, $S_r(t_1)S_l^*(t_1)\}$ is the first correlations at the first time point $t_1$, wherein $S_r(t_1)$ and $S_l(t_1)$ are the reception signals of the first and second sub-array beams at the first time point $t_1$, wherein $\{S_r(t_2)S_1^*(t_2)\}$ is the second correlations at the second time point $t_2$, wherein $S_r(t_2)$ and $S_l(t_2)$ are the reception signals of the first and second sub-array beams at the second time point $t_2$, and wherein * is a complex conjugate operator.

7. A direction of arrival estimation method used for an apparatus comprising at least first and second sub-arrays respectively including a plurality of receivers configured to receive reception signals including a reflected wave of a transmission waveform from a target, which is transmitted from the direction of arrival estimation apparatus and reflected by the target, the method comprising:

performing phasing of a plurality of the reception signals received at the first and second sub-arrays to generate first and second sub-array beams, respectively;

calculating a first correlation $\{S_r(t_1)S_l^*(t_1)\}$ (where * is a complex conjugate operator) of reception signals $S_r(t_1)$ and $S_l(t_1)$ of the first and second sub-array beams at a first time point $t_1$ and a second correlation $\{S_r(t_2)S_l^*(t_2)\}$ of reception signals $S_r(t_2)$ and $S_l(t_2)$ of the first and second sub-array beams at a second time point $t_2$;

calculating a first complex conjugate product $\{S_r(t_1)S_l^*(t_1)\}^*\{S_r(t_2)S_l^*(t_2)\}$ of the first and second correlations and a second complex conjugate product $\{S_r(t_1)S_1^*(t_1)\}\{S_r(t_2)S_1^*(t_2)\}^*$ of the first and second correlations;

finding an arrival time difference between arrival times of the reflected wave from the target at the first sub-array and at the second sub-array, using a result of an inverse trigonometric operation on a value obtained by dividing a difference between the first and second complex conjugate products by a sum of the first and second complex conjugate products, a distance between the first and second sub-array beams, a frequency change rate of the transmission wave, and a time difference between the first time point and the second time point; and finding a direction of arrival of the target, using the arrival time difference.

8. The direction of arrival estimation method according to claim 7, the method comprising:
calculating and storing first to third correlations of the reception signals of the first and second sub-array beams at time points including at least first to third time points; and
averaging at least two directions of arrivals (DOAs) calculated using combinations of two pairs of the correlations selected from the first to third correlations at the time points including at least the first to third time points.

9. The direction of arrival estimation method according to claim 7, the method comprising:
performing fitting of a straight line or a curve to a plurality of directions of arrivals (DOAs) calculated using the first to third correlations of the reception signals of the first and second sub-array beams at the time points including at least the first to third time points.

10. The direction of arrival estimation method according to claim 7, the method comprising:
calculating at least two directions of arrivals (DOAs), for respective different combinations of two sub-arrays among first to third sub-arrays included in the apparatus; and
calculating an average of the at least two directions of arrivals (DOAs).

11. The direction of arrival estimation method according to claim 7, the method comprising:
calculating the direction of arrival of the target, using the arrival time difference, a distance between the first and second sub-array beams, and a reflected wave velocity.

12. A direction of arrival estimation method used for an apparatus comprising at least first and second sub-arrays respectively including a plurality of receivers configured to receive reception signals including a reflected wave of a transmission waveform from a target, which is transmitted from the direction of arrival estimation apparatus and reflected by the target, the method comprising:
performing phasing of a plurality of the reception signals received at the first and second sub-arrays to generate first and second sub-array beams, respectively;
calculating first and second correlations of the reception signals of the first and second sub-array beams at time points including at least first and second time points and performing a predetermined operation on the first and second correlations to find an arrival time difference between arrival times of the reflected wave from the target at the first sub-array and at the second sub-array, using a result of the predetermined operation on the first and second correlations and a time difference between the first time point and the second time point; and
finding a direction of arrival of the target, using the arrival time difference,
wherein the transmission wave has a linear frequency modulation (LFM) waveform with a frequency change rate $\xi$,
wherein the method comprises:
deriving the direction of arrival of the target $\theta$ from the following equation:

$$\sin\theta = \frac{c(t_{l0} - t_{r0})}{d}$$

wherein c is the reflected wave velocity,
wherein d is a distance between the first and second sub-array beams, and
wherein $t_{l0}-t_{r0}$ is the arrival time difference between arrival times of the reflected wave from the target at the first sub-array and at the second sub-array and given by:

$$t_{l0} - t_{r0} = \frac{1}{2\pi\xi(t_1 - t_2)} \tan^{-1}\left[\frac{j[\{S_r(t_1)S_l^*(t_1)\}^*\{S_r(t_2)S_l^*(t_2)\} - \{S_r(t_1)S_l^*(t_1)\}\{S_r(t_2)S_l^*(t_2)\}^*]}{\{S_r(t_1)S_l^*(t_1)\}\{S_r(t_2)S_l^*(t_2)\}^* + \{S_r(t_1)S_l^*(t_1)\}^*\{S_r(t_2)S_l^*(t_2)\}}\right]$$

wherein $\xi$ is the frequency change rate,
wherein $t_1-t_2$ is the time difference between the first time point $t_1$ and the second time point $t_2$,
wherein $\tan^{-1}$ is an inverse tangent (arctangent) function,
wherein $j^2=-1$, $\{S_r(t_1)S_l^*(t_1)\}$ is the first correlations at the first time point $t_1$,
wherein $S_r(t_1)$ and $S_l(t_1)$ are the reception signals of the first and second sub-array beams at the first time point $t_1$,
wherein $\{S_r(t_2)S_1^*(t_2)\}$ is the second correlations at the second time point $t_2$,
wherein $S_r(t_2)$ and $S_l(t_2)$ are the reception signals of the first and second sub-array beams at the second time point $t_2$, and
wherein * is a complex conjugate operator.

13. A non-transitory computer readable medium storing a program causing a computer included in an apparatus including at least first and second sub-arrays respectively including a plurality of receivers configured to receive reception signals including a reflected wave of a transmission wave from a target, which is transmitted from the direction of arrival estimation apparatus and reflected by the target, to execute processing comprising:
performing phasing of a plurality of the reception signals received at the first and second sub-arrays to generate first and second sub-array beams, respectively;
calculating a first correlation $\{S_r(t_1)S_1^*(t_1)\}$ (where * is a complex conjugate operator) of reception signals $S_r(t_1)$ and $S_l(t_1)$ of the first and second sub-array beams at a first time point $t_1$ and a second correlation $\{S_r(t_2)S_l^*(t_2)\}$ of reception signals $S_r(t_2)$ and $S_l(t_2)$ of the first and second sub-array beams at a second time point $t_2$;

calculating a first complex conjugate product $\{S_r(t_1)S_l^*(t_1)\}^*\{S_r(t_2)S_l^*(t_2)\}$ of the first and second correlations and a second complex conjugate product $\{S_r(t_1)S_1^*(t_1)\}\{S_r(t_2)S_1^*(t_2)\}^*$ of the first and second correlations;

finding an arrival time difference between arrival times of the reflected wave from the target at the first sub-array and at the second sub-array, using a result of an inverse trigonometric operation on a value obtained by dividing a difference between the first and second complex conjugate products by a sum of the first and second complex conjugate products, a distance between the first and second sub-arrays beams, a frequency change rate of the transmission wave, and a time difference between the first time point and the second time point; and finding a direction of arrival of the target, using the arrival time difference.

14. The non-transitory computer readable medium according to claim 13, storing the program causing the computer to execute processing comprising:

calculating and storing first to third correlations of the reception signals of the first and second sub-array beams at time points including at least first to third time points, and averaging at least two directions of arrivals (DOAs) calculated using combinations of two pairs of the correlations selected from the first to third correlations at the time points including at least the first to third time points.

15. The non-transitory computer readable medium according to claim 13, storing the program causing the computer to execute processing comprising:

performing fitting of a straight line or a curve to a plurality of directions of arrivals (DOAs) calculated using the first to third correlations of the reception signals of the first and second sub-array beams at the time points including at least the first to third time points.

16. The non-transitory computer readable medium according to claim 13, storing the program causing the computer to execute processing comprising:

calculating at least two directions of arrivals (DOAs), for respective different combinations of two sub-arrays among first to third sub-arrays included in the apparatus; and calculating an average of the at least two directions of arrivals (DOAs).

17. The non-transitory computer readable medium according to claim 13, storing the program causing the computer to execute processing comprising:

calculating the direction of arrival of the target, using the arrival time difference, a distance between the first and second sub-array beams, and a reflected wave velocity.

18. A non-transitory computer readable medium storing a program causing a computer included in an apparatus including at least first and second sub-arrays respectively including a plurality of receivers configured to receive reception signals including a reflected wave of a transmission wave from a target, which is transmitted from the direction of arrival estimation apparatus and reflected by the target, to execute processing comprising:

performing phasing of a plurality of the reception signals received at the first and second sub-arrays to generate first and second sub-array beams, respectively;

calculating first and second correlations of the reception signals of the first and second sub-array beams at time points including at least first and second time points and performing a predetermined operation on the first and second correlations to find an arrival time difference between arrival times of the reflected wave from the target at the first sub-array and at the second sub-array, using a result of the predetermined operation on the first and second correlations and a time difference between the first time point and the second time point and finding a direction of arrival of the target, using the arrival time difference, wherein the transmission wave has a linear frequency modulation (LFM) waveform with a frequency change rate $\xi$, wherein the processing further comprises:

deriving the direction of arrival of the target $\theta$ from the following equation:

$$\sin\theta = \frac{c(t_{l0} - t_{r0})}{d}$$

wherein c is the reflected wave velocity, wherein d is a distance between the first and second sub-array beams, and wherein $t_{l0}-t_{r0}$ is the arrival time difference between arrival times of the reflected wave from the target at the first sub-array and at the second sub-array and given by:

$$t_{l0} - t_{r0} = \frac{1}{2\pi\xi(t_1 - t_2)}$$
$$\tan^{-1}\left[\frac{j[\{S_r(t_1)S_l^*(t_1)\}^*\{S_r(t_2)S_l^*(t_2)\} - \{S_r(t_1)S_l^*(t_1)\}\{S_r(t_2)S_l^*(t_2)\}^*]}{\{S_r(t_1)S_l^*(t_1)\}\{S_r(t_2)S_l^*(t_2)\}^* + \{S_r(t_1)S_l^*(t_1)\}^*\{S_r(t_2)S_l^*(t_2)\}}\right]$$

wherein is the frequency change rate, wherein $t_1-t_2$ is the time difference between the first time point $t_1$ and the second time point $t_2$, wherein $\tan^{-1}$ is an inverse tangent (arctangent) function, wherein $j^2=-1$, wherein $\{S_r(t_1)S_1^*(t_1)\}$ is the first correlations at the first time point $t_1$, where $S_r(t_1)$ and $S_l(t_1)$ are the reception signals of the first and second sub-array beams at the first time point $t_1$, wherein $\{S_l(t_2)S_1^*(t_2)\}$ is the second correlations at the second time point $t_2$, wherein $S_r(t_2)$ and $S_l(t_2)$ are the reception signals of the first and second sub-array beams at the second time point $t_2$, and wherein * is a complex conjugate operator.

* * * * *